United States Patent [19]
Komatsu

[11] Patent Number: 5,940,063
[45] Date of Patent: Aug. 17, 1999

[54] COORDINATE INPUT APPARATUS

[75] Inventor: Masaru Komatsu, Fukushima-ken, Japan

[73] Assignee: Alps Electric Co., Ltd., Tokyo, Japan

[21] Appl. No.: 08/884,495

[22] Filed: Jun. 27, 1997

[30] Foreign Application Priority Data

Jul. 1, 1996 [JP] Japan ..................................... 8-171163

[51] Int. Cl.$^6$ ....................................................... G09G 5/08
[52] U.S. Cl. ............................................ 345/157; 345/145
[58] Field of Search .................................... 345/159, 157, 345/160, 145, 165, 161, 163, 167

[56] References Cited

U.S. PATENT DOCUMENTS

| | | | |
|---|---|---|---|
| 5,489,900 | 2/1996 | Cali et al. | 341/34 |
| 5,508,717 | 4/1996 | Miller | 345/145 |
| 5,579,033 | 11/1996 | Rutledge et al. | 345/61 |
| 5,680,154 | 10/1997 | Shiga et al. | 345/145 |
| 5,748,180 | 5/1998 | Inukai | 345/161 |

*Primary Examiner*—Mark R. Powell
*Assistant Examiner*—Thu Nguyen
*Attorney, Agent, or Firm*—Brinks Hofer Gilson & Lione

[57] ABSTRACT

A coordinate input apparatus is provided which is capable of accurately stopping a cursor at a desired position by an easy cursor movement operation. The coordinate input apparatus includes a stick-type operation section, pressure sensor sections for detecting an operational load force applied during operation of the operation section and outputting the detected operation load force as load data, a cursor movement control section for performing counting which accords with an increase or decrease in the load data output from the pressure sensor sections and outputting load data corresponding to a count value. The coordinate data output from the cursor movement control section indicates an increase count output value in response to an increase or decrease in load data when the load data output from the pressure sensor sections increases. When load data output from the sensor sections tends to decrease, the coordinate data indicates a decrease count output value in response to a decrease in the load data with an output count value such that the current count value is greatly decreased as a starting point.

2 Claims, 3 Drawing Sheets

COORDINATE INPUT APPARATUS

BACKGROUND OF THE INVENTION

1. Field of the Invention

The present invention relates to a coordinate input apparatus. More particularly, the present invention relates to a coordinate input apparatus provided with means for preventing a moving cursor from going too far when a stick-type operation section provided in a keyboard device or the like is operated to cause the cursor within the display section to move.

2. Description of the Related Art

Hitherto, as keyboard devices, there are known a type having only various operation keys arranged in a predetermined sequence in the operation section, and a type (hereinafter, this type will be referred to as a "keyboard device with a stick-type operation section") having such operation keys and one stick-type operation section (stick pointer) at a predetermined position among the operation keys.

Meanwhile, in a known keyboard device with a stick-type operation section, a distortion gauge (a total of four distortion gauges) is bonded onto each side of the base portion of the stick-type operation section along two directions, i.e., along the X and Y directions, intersecting at right angles to each other. These distortion gauges are structured in such a way that two distortion gauges are connected in series between a DC power supply and a ground in each of the X and Y directions, and outputs corresponding to operational pressures (load forces) in each of the X and Y directions are guided out from the connection points of the two distortion gauges which are connected in series. When the tip of the stick-type operation section is pressed in a desired direction by the fingertip of the key operator, the load force applied to the stick-type operation section is applied to the respective distortion gauges in each of the X and Y directions, causing each of the values of these distortion gauges to vary. At this time, changes in these resistance values are detected as voltage changes in each of the X and Y directions, and thus by reading the detection output, load data indicating the load force at the tip of the stick-type operation section is obtained. Then, the obtained load data is subjected to digital conversion and other data processing and is converted into coordinate data within the keyboard device with a stick-type operation section. Next, the coordinate data is transmitted from a communication control section within the keyboard device with a stick-type operation section to a main unit, such as a personal computer, through a cable.

On the main unit side, the coordinate data supplied from the keyboard device with a stick-type operation section is appropriately processed, after which the data is supplied to a display section, causing a cursor displayed on the display section to move. In this case, the movement direction of the cursor is determined in response to the direction of the pressing operation applied to the stick-type operation section, and the movement speed of the cursor is determined in response to the magnitude of a load force during a pressing operation applied to the stick-type operation section.

In the above-described known keyboard device with a stick-type operation section, when the key operator presses the tip of the stick-type operation section in a desired direction, a load force due to the pressing operation is applied to the respective distortion gauges in each of the X and Y directions, causing each of the resistance values of these distortion gauges to vary. Changes in these resistance values are detected as voltage changes in each of the X and Y directions, and are formed into X-direction load data and Y-direction load data. These load data along the X and Y directions are individually converted into coordinate data in accordance with a count value by the cursor movement control section and transmitted to the main unit as described above.

FIGS. 4A and 4B are operation diagrams illustrating an example of a changed state of an operational load force when the stick-type operation section is operated in the above-described keyboard device with a stick-type operation section; FIG. 4A shows a changed state of an operational load force; and FIG. 4B shows an output count value.

As shown in FIGS. 4A and 4B, regarding the output count value of the coordinate data, when operating such that the operation load increases linearly in the first half and decreases linearly in the second half during the operation of the stick-type operation section, a range where an inclination of the increase count value is almost zero, a range where an inclination of the increase count value is small, and a range where an inclination of the increase count value is large appear continuous in the first half where the operational load increases linearly, and a range where an inclination of the decrease count value is large, a range where an inclination of the decrease count value is small, and a range where an inclination of the decrease count value is almost zero appear continuous in the second half where the operational load decreases linearly.

Here, in the above-described known keyboard device with a stick-type operation section, when the cursor on the display section of the main unit is moved by operating the stick-type operation section, there are cases where the cursor does not stop at the desired position and goes too far. Therefore, there arises problems in that it is difficult to perform a desired cursor movement. The causes for such cursor over-movement are attributed to a delay in the transmission of coordinate data to the display section, delays due to the elastic properties of the rubber cap which covers the stick-type operation section and the fingers of the key operator, and the like. These are usually difficult to avoid.

However, some key operators having a great deal of experience make a cursor move to a desired position by reducing pressure to the stick-type operation section before the desired position by taking into consideration the cursor over-movement from the desired position. Such cursor movement operation cannot be performed by everybody easily.

SUMMARY OF THE INVENTION

The present invention has been achieved to solve the above-described problems. An object of the present invention is to provide a coordinate input apparatus capable of accurately stopping a cursor at a desired position by an easy cursor movement operation.

To achieve the above-described object, the coordinate input apparatus in accordance with the present invention comprises: means for detecting an increase count value corresponding to an increase in the load data when load data increases in a case in which a count value is determined by performing increase or decrease counting corresponding to an increase or decrease in load data obtained by detecting a load force applied during the operation of the stick-type operation section, after which coordinate data based on the determined count value is obtained and the cursor on the display screen is moved on the basis of this coordinate data, and when load data tends to decrease, the current count value is sharply decreased, preferably to half its value, and then a decrease count value corresponding to a decrease in the load data is determined from the decreased count value.

Use of such means becomes equivalent to substantially reducing pressure to the stick-type operation section before a desired position when the cursor displayed on the display screen is moved. Therefore, it becomes possible to prevent the cursor from going too far from the desired position and to always stop the cursor accurately at the desired position.

In the present invention, the coordinate input apparatus comprises: a stick-type operation section; pressure sensor sections for detecting load forces applied during the operation of the stick-type operation section and outputting the detected forces as load data; and a cursor movement control section for performing counting in accordance with an increase or decrease in the load data output from the pressure sensor sections, wherein coordinate data output from the cursor movement control section indicates an increase count output value corresponding to an increase in the load data when the load data output from the pressure sensor sections increases, and indicates a decrease count output value corresponding to a decrease in the load data with an output count value such that the current count value is considerably decreased as a starting point when the load data output from the pressure sensor sections tends to decrease.

In this case, the starting point of the decrease count output value is preferably approximately half the current count value of the load data.

According to the present invention, a pressure sensor section detects a load force of the stick-type operation section and outputs this detected load data as load data. In the cursor movement control section, in a case in which increase or decrease counting in response to an increase or decrease in the load data supplied from the pressure sensor section is performed, coordinate data corresponding to the count value is output, and the position of the cursor displayed on the display screen is moved in response to the supplied coordinate data, the counting of the load data in the cursor movement control section is performed to obtain an increase count output value corresponding to an increase in the load data when the load data increases, and when the load data tends to decrease, a decrease count output value starting from a sharply decreased count value of the current load data is obtained. Therefore, the operation equivalent to substantially reducing pressure to the stick-type operation section is performed before a desired position when the cursor on the display screen is moved. Thus, it becomes possible to prevent the cursor from going too far from a desired position and to always stop the cursor accurately at the desired position.

The above and further objects, aspects and novel features of the invention will become more apparent from the following detailed description when read in connection with the accompanying drawings.

DESCRIPTION OF THE PREFERRED EMBODIMENT

A preferred embodiment of the present invention will be described below with reference to the accompanying drawings.

Figure 1:
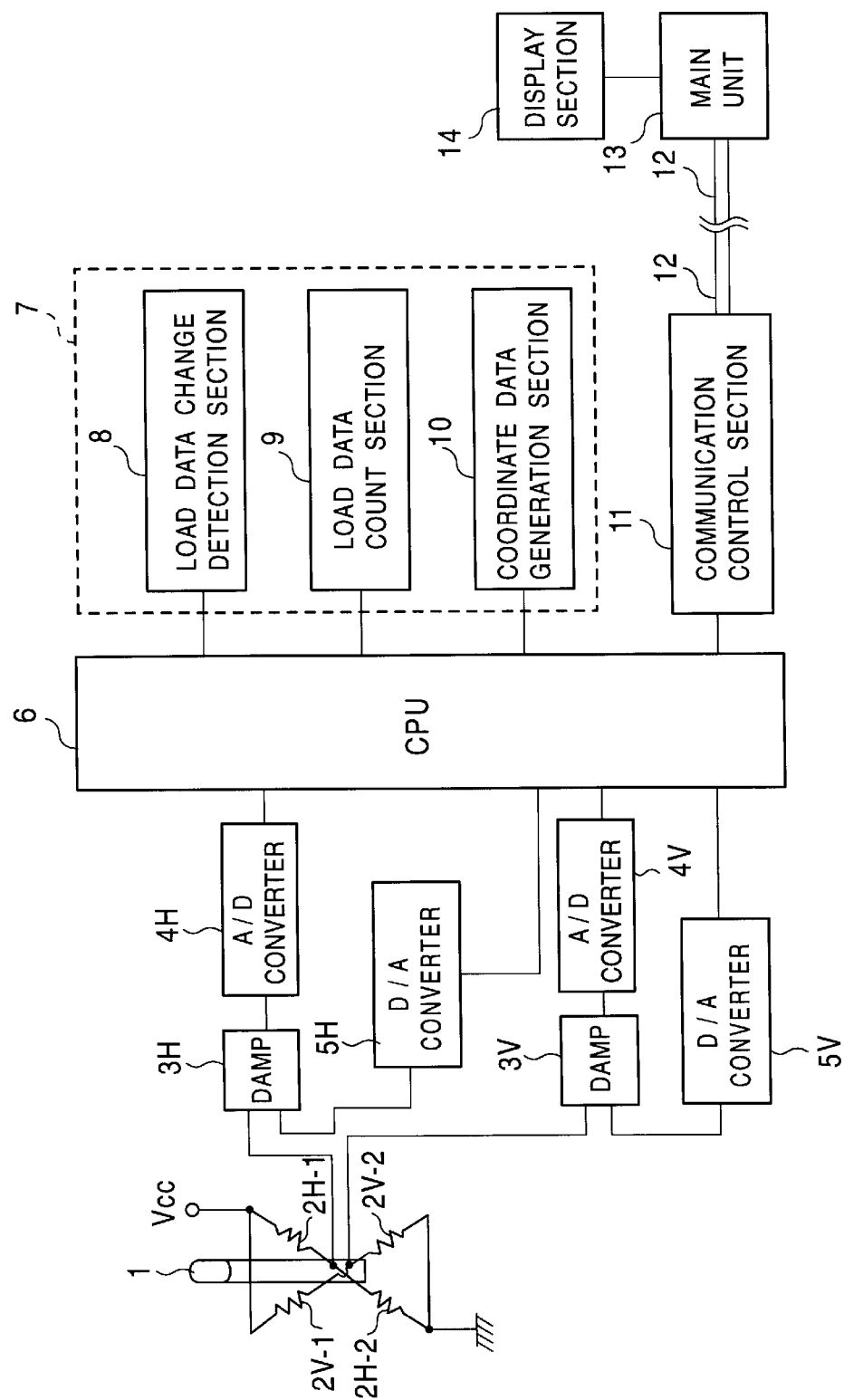
FIG. 1 is a block diagram illustrating an embodiment of a coordinate input apparatus according to the present invention.

FIG. 1 is a block diagram illustrating an embodiment of a coordinate input apparatus according to the present invention, and also illustrates an example of a keyboard device having a stick-type operation section.

As shown in FIG. 1, in a stick-type operation section 1, two distortion gauges (pressure sensors) 2H-1 and 2H-2 disposed along the transverse direction are bonded to both sides of the base portion thereof in a transverse direction (in the X-axis direction), and two distortion gauges (pressure sensors) 2V-1 and 2V-2 disposed along the longitudinal direction are bonded to both sides of the same base portion in a longitudinal direction (in the Y-axis direction). The two distortion gauges 2H-1 and 2H-2 disposed along the transverse direction are connected in series between a power terminal Vcc and a ground, and the two distortion gauges 2V-1 and 2V-2 disposed along the longitudinal direction are also connected in series between the power terminal Vcc and the ground. Here, if the tip of the stick-type operation section 1 is pressed by the fingertip of the key operator, the resistance values of the distortion gauges 2H-1 and 2H-2 relatively vary in response to the magnitude and polarity of the transverse components of the pressing force, and in a similar manner, the resistance values of the distortion gauges 2V-1 and 2V-2 disposed along the longitudinal direction also relatively vary in response to the magnitude and polarity of the longitudinal components of the pressing force. A differential amplifier (DAMP) 3H disposed along the transverse direction is connected at one end to the connection point of the two distortion gauges 2H-1 and 2H-2 disposed along the transverse direction and connected at the other end to the output terminal of a digital/analog (D/A) converter 5H disposed along the transverse direction. A differential amplifier (DAMP) 3V disposed along the longitudinal direction is also connected at one end to the connection point of the two distortion gauges 2V-1 and 2V-2 disposed along the longitudinal direction and connected at the other end to the output terminal of a digital/analog (D/A) converter 5V disposed along the longitudinal direction. An analog/digital (A/D) converter 4H disposed along the transverse direction is connected at its input terminal to the output terminal of the differential amplifier 3H disposed along the transverse direction, and an analog/digital converter (ADC) 4V disposed along the longitudinal direction is connected at its input terminal to the output terminal of the differential amplifier 3V disposed along the longitudinal direction. The analog/digital converter 4H disposed along the transverse direction is connected at its output terminal to a central processing unit (CPU) 6, and the analog/digital converter 4V disposed along the longitudinal direction is connected at its output terminal to the central processing unit. The digital/analog converter 5H disposed along the transverse direction is connected at its input terminal to the central processing unit 6 and connected at its output terminal to the other input terminal of the differential amplifier 3H disposed along the transverse direction. The digital/analog converter 5V disposed along the longitudinal direction is also connected at its input terminal to a central processing unit 6 and connected at its output terminal to the other input terminal of the differential amplifier 3V disposed along the longitudinal direction.

Further, a cursor movement control section 7 is formed of a load data change detection section 8, a load data count section 9, and a coordinate data generation section 10. Each of the load data change detection section 8, the load data count section 9, and the coordinate data generation section 10 is connected to a central processing unit 6. A communication control section 11 is connected at its input terminal to the central processing unit 6 and connected at its output terminal to the input terminal of a main unit 13, such as a personal computer, through a transmission cable 12, and a display section 14, such as a display device, is connected to the main unit 13.

Figure 2:
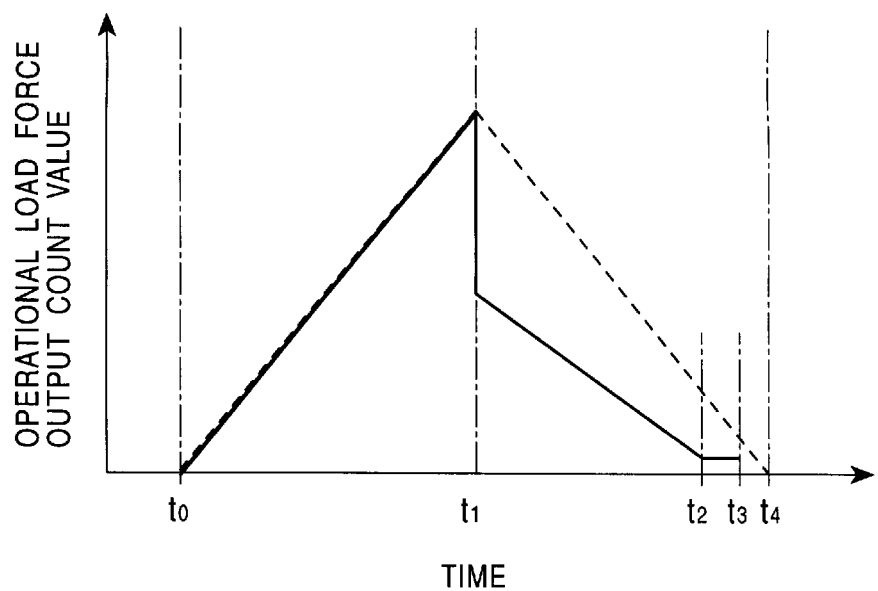
FIG. 2 is a characteristic view illustrating an example of a changed state of an operational load force during the operation of a stick-type operation section, and an output count value corresponding to the changed state in the embodiment shown in FIG. 1.

FIG. 2 is a characteristic view illustrating an example of the changed state of an operational load force with the passage of time during the operation of a stick-type operation section, and an output count value of the load data count section 9 corresponding to the changed state in the embodiment shown in FIG. 1.

In FIG. 2, the dotted line indicates the changed state of the operational load force, and the solid line indicates the output count value.

Here, the operation of a keyboard device of this embodiment will be described with reference to FIG. 2. However, in this embodiment, the operations performed by each of the components 2H-1, 2H-2, 3H and 5H disposed along the transverse direction and the operations performed by each of the components 2V-1, 2V-2, 3V and 5V disposed along the longitudinal direction are substantially the same and therefore, in the following description of the operations, only the operations performed by each of the components 2H-1, 2H-2, 3H and 5H disposed along the transverse direction will be described, and a description of the operations performed by each of the components 2V-1, 2V-2, 3V and 5V disposed along the longitudinal direction has been omitted.

As shown in FIG. 2, when the key operator starts the operation of the stick-type operation section 1 at time $t_o$, each of the resistance values of the distortion gauges 2H-1 and 2H-2 disposed along the transverse direction relatively varies in response to the direction of the operation and the magnitude of the load force during the operation. In response to the changes in the resistance values, a DC voltage indicating the load force during the operation of the stick-type operation section 1 is generated at the connection point of the distortion gauges 2H-1 and 2H-2 disposed along the transverse direction. This DC voltage is supplied as load data to the differential amplifier 3H disposed along the transverse direction. The differential amplifier 3H disposed along the transverse direction differentially amplifies the DC voltage and a correction value supplied from a digital/analog converter 5H disposed along the transverse direction, and generates an analog output voltage of the difference between them. An analog/digital converter 4H disposed along the transverse direction converts the analog output voltage of the differential amplifier 3H disposed along the transverse direction into digital form and supplies it as digital load data to the central processing unit 6.

Next, the central processing unit 6 supplies the digital load data applied from the analog/digital converter 4H disposed along the transverse direction to the load data change detection section 8 whereby the changed state of the digital load data is detected.

At this point, when a time between time $t_o$ and time $t_1$ is reached, the digital load data is in a simple increasing state; therefore, the load data change detection section 8 generates a first detection output indicating a simple increase and supplies it to the central processing unit 6. At this time, in response to the first detection output supplied from the load data change detection section 8, the central processing unit 6 sets the count state of the load data count section 9 to a simple increase-count state. As a result, the load data count section 9 performs increase counting of the digital load data supplied from the central processing unit 6, generates an output count value indicating a simple increase as indicated by the solid line in FIG. 2, and supplies it to the central processing unit 6. Next, the central processing unit 6 supplies the output count value supplied from the load data count section 9 to the coordinate data generation section 10. The coordinate data generation section 10 converts the supplied output count value into corresponding coordinate data and supplies it to the central processing unit 6. Then, the central processing unit 6 supplies the coordinate data supplied from the coordinate data generation section 10 to the communication control section 11. The communication control section 11 causes the input coordinate data to be transmitted from the keyboard device through the transmission cable 12 to the main unit 13, such as a personal computer, which is connected externally. When the coordinate data is supplied, the main unit 13 processes it into data appropriate for display and then supplies it to the display section 14 so that the cursor displayed on the display section 14 is appropriately moved horizontally in response to the contents of the coordinate data.

In such a state, when time $t_1$ is reached and the digital load data tends to decrease from the simple increase as indicated by the dotted line, the load data change detection section 8 generates a second detection output indicating a decrease tendency and supplies it to the central processing unit 6. At this time, in response to the second detection output supplied from the load data change detection section 8, the central processing unit 6 sets the count state of the load data count section 9 to a decrease count state. As a result, the load data count section 9 decreases the count value counted up until then by half and supplies the output count value which is decreased by half to the central processing unit 6. The subsequent operations are the same as the above-described operations. Coordinate data is output from the coordinate data generation section 10, this coordinate data is supplied to the main unit 13 through the communication control section 11 and the transmission cable 12, and the cursor displayed on the display section 14 is placed in a moving state in response to the contents of the coordinate data.

Next, when a time between time $t_1$ and time $t_2$ is reached, the digital load data is in a simple decreasing state as indicated by the dotted line; therefore, the load data change detection section 8 generates a third detection output indicating a simple decreasing state and supplies it to the central processing unit 6. As a result, the load data count section 9 performs decrease counting of the digital load data supplied from the central processing unit 6. However, since the current count value is decreased by half immediately before decrease counting is performed, the decrease counting thereafter is performed on the digital load data which has been decreased, an output count value indicating a simple decrease is generated as indicated by the solid line in FIG. 2, and the count value is supplied to the central processing unit 6. The subsequent operations are the same as the above-described operations. Coordinate data is output from the coordinate data generation section 10, this coordinate data is supplied to the main unit 13 through the communication control section 11 and the transmission cable 12, and the cursor displayed on the display section 14 is placed in a moving state in response to the contents of the coordinate data, i.e., in a moving state in which the moving speed gradually slows.

Then, when a time between time $t_2$ and time $t_3$ is reached, the digital load data is still in a simple decreasing state as indicated by the dotted line. Upon receiving data showing that the count value in the load data count section 9 has fallen below a predetermined value under control of the central processing unit 6, the load data change detection section 8 generates a fourth detection output indicating a non-change state, and supplies it to the central processing unit 6. At this time, in response to the fourth detection output supplied from the load data change detection section 8, the central processing unit 6 sets the changed state of the load data count section 9 to a non-change count state. As a result, as indicated by the solid line in FIG. 2, the load data count section 9 maintains the output count value at the current count regardless of the fact that digital load data which decreases in a simple manner has been supplied, and supplies this maintained output count value to the central processing unit 6. Also in this case, the subsequent operations are the same as the above-described operations. Coordinate data is output from the coordinate data generation section 10, this coordinate data is supplied to the main unit 13 through the communication control section 11 and the transmission cable 12, and the cursor displayed on the display section 14 is placed in a moving state in response to the contents of the coordinate data, i.e., in a moving state in which the movement of the cursor is stopped.

Next, when time $t_3$ is reached, the digital load data is still in a simple decreasing state as indicated by the dotted line. Upon receiving data showing that the continuation time of the fourth detection output has reached a fixed time under control of the central processing unit 6, the load data change detection section 8 generates a fifth detection output for resetting the count value and supplies it to the central processing unit 6. At this time, in response to the fifth detection output supplied from the load data change detection section 8, the central processing unit 6 sets the state of the load data count section 9 into a reset state. As a result, as indicated by the solid line in FIG. 2, regardless of the fact that digital load data which decreases in a simple manner has been supplied, the load data count section 9 sets the current count value to 0 and supplies this 0 count value to the central processing unit 6. Also in this case, the subsequent operations are the same as the above-described operations. Coordinate data is output from the coordinate data generation section 10, this coordinate data is supplied to the main unit 13 through the communication control section 11 and the transmission cable 12, and the cursor displayed on the display section 14 is placed in a moving state in response to the contents of the coordinate data, i.e., in a state in which the movement of the cursor is completely stopped.

Then, when a time between time $t_3$ and time $t_4$ is reached, the digital load data is still in a simple decreasing state as indicated by the dotted line. Following the above, a fifth detection output is generated and supplied to the central processing unit 6. At this time, in response to the fifth detection output supplied from the load data change detection section 8, the central processing unit 6 maintains the state of the load data count section 9 in a reset state. As a result, the load data count section 9 also outputs a 0 count value and supplies it to the central processing unit 6. Also in this case, the subsequent operations are the same as the above-described operations. Coordinate data is output from the coordinate data generation section 10, this coordinate data is supplied to the main unit 13 through the communication control section 11 and the transmission cable 12, and the cursor displayed on the display section 14 is placed in a moving state in response to the contents of the coordinate data, i.e., in a state in which the movement of the cursor is completely stopped.

As described above, according to this embodiment, for the counting of the load data in the load data count section 9 of the cursor movement control section 7, an increase count output value corresponding to an increase of the load data is generated. When the load data tends to decrease, a decrease count output value starting from a state in which the count value of the the current load data is decreased by half is generated. Therefore, an operation equivalent to the following, i.e., when the cursor displayed on the display section 14 is to be moved, the pressure to the stick-type operation section 1 is substantially reduced before a desired position, is performed. Thus, it becomes possible to prevent the cursor from moving too far from the desired position and to always stop the cursor accurately at the desired position.

Figure 3:
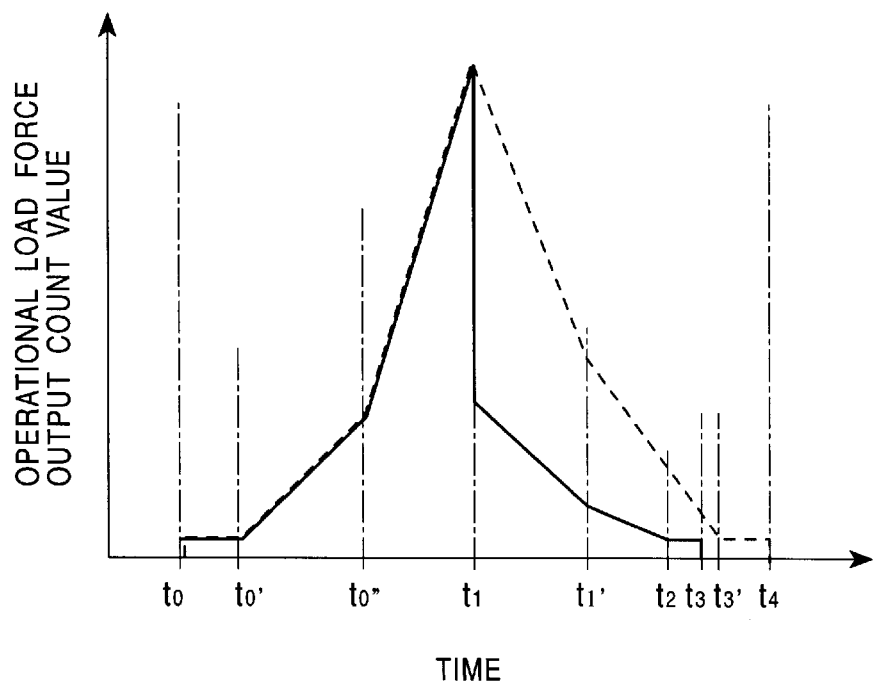
FIG. 3 is a characteristic view illustrating another example of a changed state of an operational load force during the operation of a stick-type operation section, and an output count value corresponding to the changed state in the embodiment shown in FIG. 1.
Figure 4A:
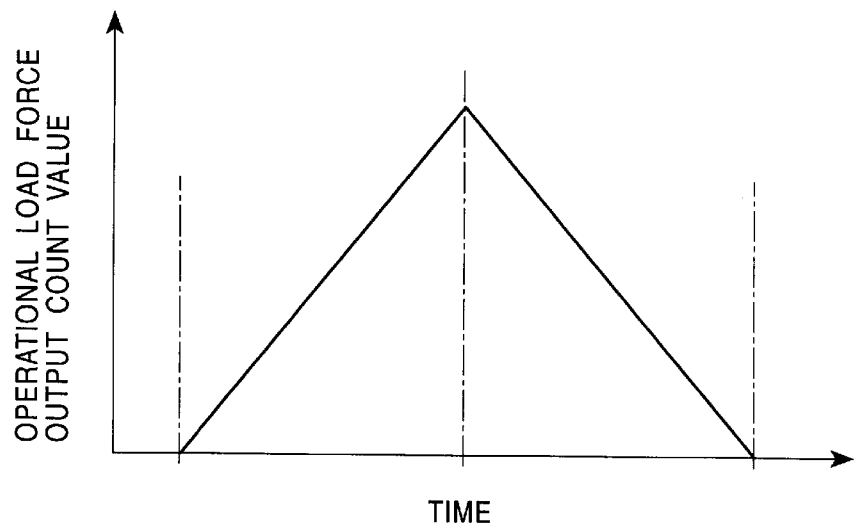
FIGS. 4A and 4B are characteristic views illustrating an example of a changed state of an operational load force during the operation of a stick-type operation section, and an output count value corresponding to the changed state in a conventional keyboard device.
Figure 4B:
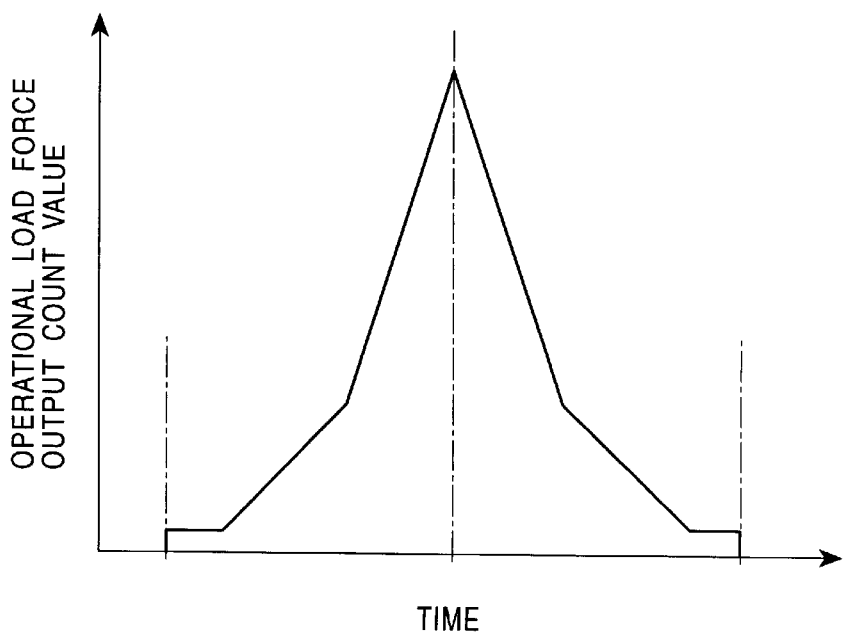

FIG. 3 is a characteristic view illustrating another example of a changed state of an operational load force with the passage of time during the operation of the stick-type operation section 1, and an output count value of the load data count section 9, which value corresponds to the changed state.

Also in FIG. 3, the dotted line indicates a changed state of the operational load force, and the solid line indicates an output count value.

As indicated by the dotted line in FIG. 3, when the stick-type operation section 1 is operated, an almost fixed, small operational load force is applied in a period from time $t_0$ to time $t'_0$; an operational load force which increases simply at a relatively small rate is applied in a period from time $t'_0$ to time $t''_0$; an operational load force which increases simply at a relatively large rate is applied in a period from time $t''_0$ to time $t_1$; an operational load force which tends to decrease is applied at time $t_1$; an operational load force which decreases simply at a relatively large rate is applied in a period from time $t_1$ to time $t'_1$; an operational load force which decreases simply at a relatively small rate is applied in a period from time $t'_1$ to time $t'_3$; and, an almost fixed, small operational load force is applied in a period from time $t'_3$ to time $t_4$. In this case, the output count value of the load data count section 9 changes as described below.

As indicated by the solid line in FIG. 3, when, from time to $t_0$ time $t_1$, the operational load force of the stick-type operation section 1 is in a simple increasing state or a non-change state, the output count value indicates a count value corresponding to the simple increasing state or the non-change state of the operational load force. However, when time $t_1$ is reached and the operational load force of the stick-type operation section 1 tends to decrease, the current count value indicates a value which is sharply decreased to half its original value or less, e.g., approximately ⅓. Thereafter, when a time between time $t_1$ and time $t_3$ is reached and the operational load force of the stick-type operation section 1 is in a simple decreasing state, the output count value decreases to a count value in response to the simple decrease of the operational load force. The value of the operational load force used at this time is a value of the operational load force which is decreased in response to the sharp decrease in the count value at time $t_1$.

In addition to the operations described above, the following operations, that is, after an output count value is obtained, the output count value is converted into coordinate data, coordinate data is supplied to the main unit 13 through the communication control section 11 and the transmission cable 12, and the cursor on the display section 14 is placed in a moving state in response to the contents of the coordinate data, are the same as the above-described operation of the earlier example based on the operation diagram shown in FIG. 2. For this reason, a further description of the operation of this example based on the operation diagram shown in FIG. 3 has been omitted.

The operational advantages obtained from this example based on the operation diagram shown in FIG. 3 are substantially the same as the operational advantages obtained from the earlier example based on the operation diagram shown in FIG. 2.

Although in the above-described embodiment an example of a keyboard device having a stick-type operation section is described as a coordinate input apparatus, of course, the coordinate input apparatus of the present invention is not limited to a keyboard device having a stick-type operation section, and may include other coordinate input apparatuses similar to a keyboard device having a stick-type operation section.

As has been described up to this point, according to the present invention, there are provided pressure sensor sections for detecting an operational load force on a stick-type operation section and outputting this detected operational load force as load data, and a cursor movement control section for performing increase or decrease counting of the load data supplied from the pressure sensor sections in response to an increase or decrease in load data. Regarding the count of the load data in the cursor movement control section, when the cursor displayed on a display screen is moved in response to supplied coordinate data, an increase count output value in response to an increase in the load data is obtained when the load data increases, and when the load data tends to decrease, a decrease count value starting from a sharply decreased current count value of the load data is obtained. Therefore, an operation equivalent to the following is performed, i.e., when the cursor on the display section is moved, pressure to the stick-type operation section before a desired position is reduced. Therefore, there are advantages in that it becomes possible to prevent the cursor from going too far from a desired position and to always stop the cursor accurately at the desired position.

Many different embodiments of the present invention may be constructed without departing from the spirit and scope of the present invention. It should be understood that the present invention is not limited to the specific embodiment described in this specification. To the contrary, the present invention is intended to cover various modifications and equivalent arrangements included within the spirit and scope of the invention as hereafter claimed. The scope of the following claims is to be accorded the broadest interpretation so as to encompass all such modifications, equivalent structures and functions.

What is claimed is:

1. A coordinate input apparatus, comprising:

a stick-type operation section;

pressure sensor sections for detecting load forces applied during the operation of said stick-type operation section and outputting the detected operation loads as load data; and a cursor movement control section for performing counting in accordance with an increase or decrease in said load data output from said pressure sensor sections, wherein coordinate data output from said cursor movement control section indicates an increase count output value corresponding to an increase in said load data when said load data output from said pressure sensor sections increases, and indicates a decrease count output value corresponding to a decrease in said load data with an output count value such that the current count value is decreased considerably as a starting point when said load data output from said pressure sensor sections tends to decrease and when the load data is changed from an increasing tendency to a decreasing tendency, the current count value is decreased at a predetermined rate different from the rate of decrease of the load data and when a load data outputted from the pressure sensor sections is initially decreased, the starting point of the count output value corresponding to said load data is decreased in a discontinuous manner.

2. A coordinate input apparatus according to claim 1, wherein the starting point of said decrease count output value is approximately half the current count value of said load data.

* * * * *